United States Patent
Malvern

(10) Patent No.: US 10,101,357 B2
(45) Date of Patent: Oct. 16, 2018

(54) ACCELEROMETER

(75) Inventor: Alan Malvern, Plymouth (GB)

(73) Assignee: Atlantic Inertial Systems Limited, Plymouth, Devon (GB)

( * ) Notice: Subject to any disclaimer, the term of this patent is extended or adjusted under 35 U.S.C. 154(b) by 159 days.

(21) Appl. No.: 13/992,129

(22) PCT Filed: Dec. 2, 2011

(86) PCT No.: PCT/GB2011/001671
§ 371 (c)(1),
(2), (4) Date: Jun. 6, 2013

(87) PCT Pub. No.: WO2012/076837
PCT Pub. Date: Jun. 14, 2012

(65) Prior Publication Data
US 2013/0247667 A1 Sep. 26, 2013

(30) Foreign Application Priority Data
Dec. 7, 2010 (GB) .................................. 1020722.3

(51) Int. Cl.
*G01P 15/125* (2006.01)
*G01P 15/18* (2013.01)
*G01P 15/08* (2006.01)

(52) U.S. Cl.
CPC ............ *G01P 15/125* (2013.01); *G01P 15/18* (2013.01); *G01P 2015/0814* (2013.01); *G01P 2015/0871* (2013.01)

(58) Field of Classification Search
CPC ................... G01P 15/125; G01P 15/18; G01P 2015/0814; G01P 2015/0871
(Continued)

(56) References Cited

U.S. PATENT DOCUMENTS 3,943,778 A * 3/1976 Wyse ..................... F16D 3/005
                                                    29/445
6,062,082 A * 5/2000 Guenther et al. .......... 73/514.16
(Continued)

FOREIGN PATENT DOCUMENTS

EP          2081030          7/2009
JP       2006250829          9/2006
(Continued)

OTHER PUBLICATIONS

Japanese office action for JP2013-542599 dated Oct. 27, 2015.
Korean Office Action for appln. No. 10-2013-7016788 dated Jan. 22, 2018.

*Primary Examiner* — Son Le
*Assistant Examiner* — Tarun Sinha
(74) *Attorney, Agent, or Firm* — O'Shea Getz P.C.

(57) ABSTRACT

An accelerometer comprises a support, a first mass element and a second mass element, the mass elements being rigidly interconnected to form a unitary movable proof mass, the support being located at least in part between the first and second mass elements, a plurality of mounting legs securing the mass elements to the support member, at least two groups of movable capacitor fingers provided on the first mass element and interdigitated with corresponding groups of fixed capacitor fingers associated with the support, and at least two groups of movable capacitor fingers provided on the second mass element and interdigitated with corresponding groups of fixed capacitor fingers associated with the support.

14 Claims, 5 Drawing Sheets

(58) Field of Classification Search
USPC .................................................. 73/514.32
See application file for complete search history.

(56) References Cited

U.S. PATENT DOCUMENTS

| | | | |
|---|---|---|---|
| 7,047,808 B2 | 5/2006 | Malvern et al. | |
| 7,267,006 B2 | 9/2007 | Malvern | |
| 7,562,573 B2 | 7/2009 | Yazdi | |
| 2003/0010123 A1* | 1/2003 | Malvern | G01P 15/0802 73/514.32 |
| 2003/0200807 A1* | 10/2003 | Hulsing, II | G01C 19/5719 73/514.01 |
| 2005/0052092 A1* | 3/2005 | Laermer | 310/311 |
| 2006/0032310 A1 | 2/2006 | Merassi et al. | |
| 2006/0037397 A1 | 2/2006 | Memishian | |
| 2006/0112765 A1 | 6/2006 | Malvern | |
| 2008/0196499 A1* | 8/2008 | Li et al. | 73/510 |
| 2008/0210005 A1* | 9/2008 | Rougeot | G01C 19/5747 73/504.12 |
| 2009/0007669 A1* | 1/2009 | Fukaura | 73/514.32 |
| 2009/0114016 A1 | 5/2009 | Nasiri et al. | |
| 2009/0314085 A1 | 12/2009 | Stahl et al. | |
| 2010/0212423 A1 | 8/2010 | Rehle | |
| 2010/0326188 A1 | 12/2010 | Classen et al. | |
| 2011/0041608 A1* | 2/2011 | Wilner et al. | 73/504.15 |
| 2011/0045795 A1* | 2/2011 | Sacknoff | G08B 21/0415 455/404.1 |

FOREIGN PATENT DOCUMENTS

| | | |
|---|---|---|
| WO | 2010032818 | 9/2009 |
| WO | 2010032821 | 9/2009 |

* cited by examiner

ACCELEROMETER

This application is entitled to the benefit of, and incorporates by reference essential subject matter disclosed in PCT Application No. PCT/GB2011/001671 filed on Dec. 2, 2011, which claims priority to Great Britain Application No. 1020722.3 filed Dec. 7, 2010.

BACKGROUND OF THE INVENTION

1. Technical Field

This invention relates to an accelerometer, and in particular to a microelectromechanical (MEMS) accelerometer of relatively small dimensions and low cost.

2. Background Information

MEMS accelerometers are in widespread use, for example in automotive and other applications. One area in which they are used is in global positioning applications, to provide back-up information indicative of the movement of a vehicle for use during short intervals in which satellite communications links are temporarily interrupted. However, it will be appreciated that this is merely one possible application in which a MEMS accelerometer may be used, and that the invention is not restricted in this regard.

U.S. Pat. No. 7,047,808 describes a MEMS accelerometer suitable for use in such applications. The accelerometer comprises a proof mass of plate-like form surrounded by a ring-like support member. The support member and the proof mass are substantially coplanar, and the proof mass is connected to the support member by means of a series of mounting legs that are formed integrally with the mass and the support member. Each leg extends in a direction substantially perpendicular to a direction in which the accelerometer is sensitive to accelerations. In use, the accelerometer is mounted upon an object, the motion of which is to be monitored, the accelerometer being mounted in such a manner that the support member is rigidly secured to the object, the accelerometer being correctly orientated such that the mounting legs each extend in a direction substantially perpendicular to the sensing direction. If the object is accelerated in the sensing direction, it will be appreciated that the inertia of the proof mass will result in the proof mass moving relative to the support member, the mounting legs flexing and applying a restoring force urging the proof mass back towards its rest position.

In order to permit relative movement between the proof mass and the support member to be sensed and thereby to permit an electrical output indicative of the acceleration to be produced, the proof mass is provided with several groups of capacitor fingers, each of which extends substantially parallel to the mounting legs. Similarly, the support member is provided with several groups of capacitor fingers, the fingers of each group being interdigitated with the capacitor fingers of a corresponding group associated with the proof mass. Movement of the proof mass relative to the support member results in relative movement of adjacent ones of the interdigitated fingers. By taking appropriate capacitance measurements, the position or movement of the proof mass relative to the support member can be determined. As the movement of the proof mass relative to the support member arises in use from the object to which the accelerometer is mounted experiencing an acceleration, it will be appreciated that the movement output is also indicative of the experienced acceleration.

Other, similar devices are described in, for example, U.S. Pat. No. 7,562,573 and U.S. Pat. No. 7,267,006.

In an arrangement of this type there is a need to make drive electrical connections to the various groups of capacitor fingers provided on the support member. Thus, where the accelerometer includes, for example, four groups of capacitor fingers associated with the support member, four such connections need to be made in addition to the required ground and output connections. The provision of such connections takes up space, resulting in the accelerometer being relatively large, and there are also cost implications associated with the need to provide such connections, and additional manufacturing complexities.

It is an object of the invention to provide an accelerometer in which at least some of the disadvantages with known arrangements are overcome or are of reduced effect.

There is a desire to provide an accelerometer device that is sensitive to accelerations in two or more perpendicular directions, and it is another object of the invention to provide an accelerometer suitable for use in such a device.

SUMMARY OF THE DISCLOSURE

According to the present invention there is provided an accelerometer comprising a support, a first mass element and a second mass element, the mass elements being rigidly interconnected to form a unitary movable proof mass, the support being located at least in part between the first and second mass elements, a plurality of mounting legs supporting the mass elements for movement relative to the support, at least two groups of movable capacitor fingers provided on the first mass element and interdigitated with corresponding groups of fixed capacitor fingers associated with the support, and at least two groups of movable capacitor fingers provided on the second mass element and interdigitated with corresponding groups of fixed capacitor fingers associated with the support.

Such an arrangement has the advantage that the accelerometer is of relatively compact, space efficient form.

Conveniently, a single, shared electrical connection can be provided to permit connection to two of the groups of fixed capacitor fingers associated with the support. Likewise, a single electrical connection can be provided to permit connection to another two of the groups of fixed capacitor fingers associated with the support. As a result, manufacture can be simplified by reducing the total number of connections that are required. Consequential cost savings can be made, and additional space savings can also be achieved.

It is desirable for the accelerometer to be capable of withstanding very large accelerations without sustaining damage thereto. In order to assist with providing this functionality, the accelerometer is preferably provided with stop formations operable to limit the distance through which the mass elements are able to move. Conveniently, the stop formations are arranged to limit such movement to a degree sufficient to prevent contact between adjacent ones of the capacitor fingers.

In order to minimize disruption to the operation of the accelerometer following exposure to such a very large acceleration, preferably the stop formations are provided on a part of the support that is at the same electrical potential as the first and second mass elements. As a consequence, electrical grounding in the event of such a very large acceleration is avoided.

The mass elements and support are conveniently fabricated by etching of a silicon wafer supported, in use, between a pair of substrates, for example in the form of glass plates. The space between the mass elements and the support is conveniently sealed and gas filled so as to provide damping to movement of the proof mass.

The invention further relates to a two axis accelerometer device comprising a pair of accelerometers of the type described hereinbefore formed integrally with one another and orientated so as to be perpendicular to one another.

As the accelerometers are of relatively small size, and the number of electrical connections required is relatively low, the incorporation of two such accelerometers into a single device to provide a two axis accelerometer is relatively convenient.

BRIEF DESCRIPTION OF THE DRAWINGS

The invention will further be described, by way of example, with reference to the accompanying drawings, in which.

DETAILED DESCRIPTION OF THE INVENTION

Figure 1:
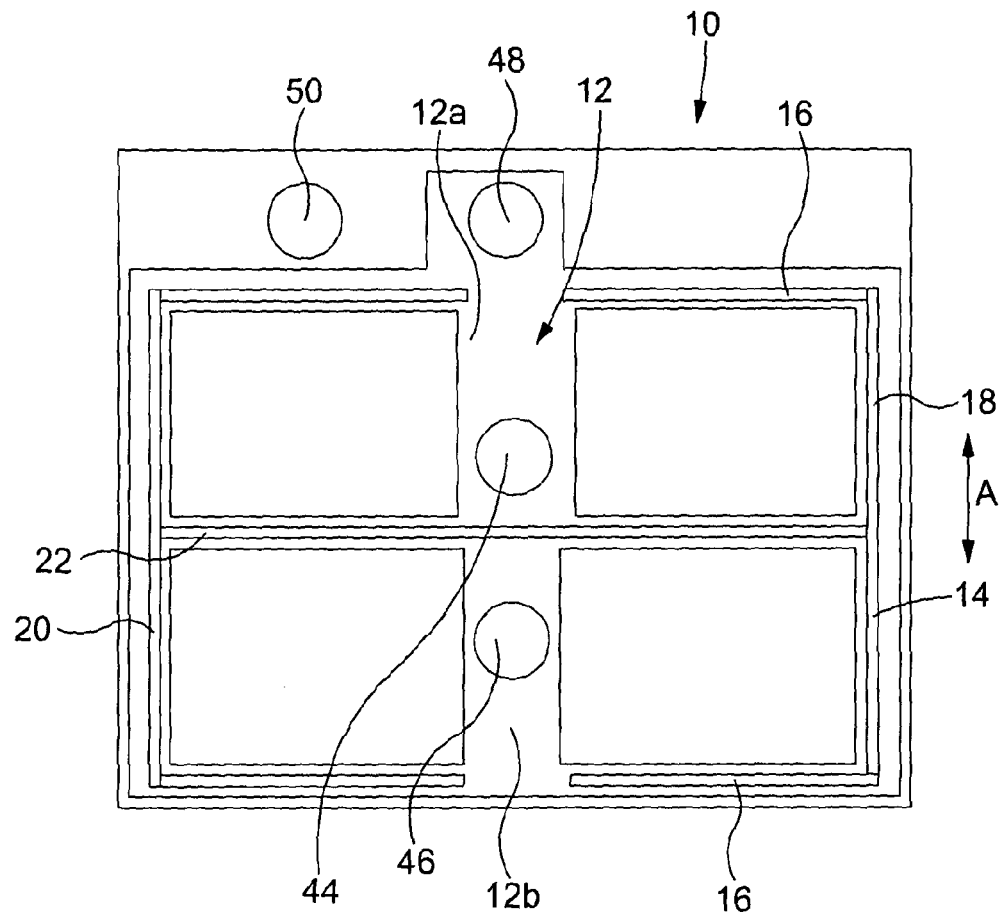
FIG. 1 is a diagrammatic representation of an accelerometer in accordance with one embodiment of the invention.

Referring firstly to FIG. 1, an accelerometer 10 is illustrated comprising a support 12 to which a proof mass 14 is movably mounted by means of a series of mounting legs 16. The proof mass 14, legs 16 and support 12 are formed integrally with one another and are substantially coplanar, for example being fabricated by appropriate etching or other processing of a silicon wafer.

The proof mass 14 is made up of a first mass element 18, connected to the support 12 by a pair of the mounting legs 16, and a second mass element 20 connected to the support 12 by another pair of the mounting legs 16. A cross brace 22 interconnects the first and second mass elements 18, 20 in such a manner as to ensure that they move together, in unison, in use and so act as a single mass.

The mounting legs 16 are all parallel to one another and extend substantially perpendicularly to a sensing direction (indicated by arrow A in FIG. 1) in which the proof mass 14 is movable relative to the support 12, in use. The mounting legs 16 apply a biasing load to the proof mass 14 urging the proof mass 14 towards a central, rest position. In use, if the accelerometer 10 is subject to an acceleration in the sensing direction A, the inertia of the proof mass 14 will result in the proof mass 14 moving relative to the support 12, such movement being accommodated by deflection of the mounting legs 16, and taking place against the action of the restoring load applied by the resilience of the mounting legs 16 urging the proof mass 14 back towards its central position. The distance through which the proof mass 14 moves is related to the magnitude of the acceleration to which the accelerometer has been subject.

As shown, the first mass element 18 and second mass element 20 are spaced apart from one another, and the support 12 extends into the space therebetween. The brace 22 also extends across this space, and the support 12 is shaped to include a break through which the brace 22 extends so that the proof mass 14 is free to move relative to the support 12. The support 12 thus takes the form of an upper support part 12a and a lower support part 12b, separated by the aforementioned break.

Figure 6:
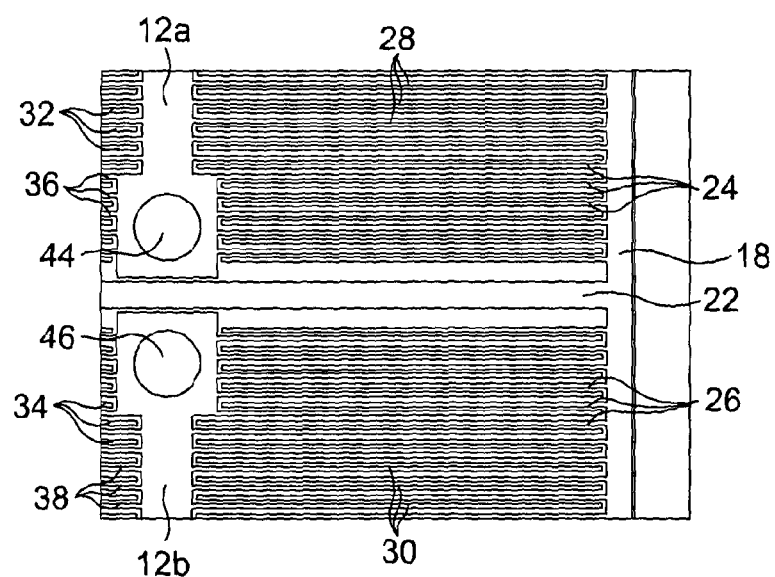
FIG. 6 is a diagrammatic view to an enlarged scale illustrating part of the device of FIG. 2.

As shown in FIG. 6, the first mass element 18 carries upper and lower groups 24, 26 of movable capacitor fingers, each finger extending substantially parallel to the mounting legs 16 and so substantially perpendicular to the direction A in which the proof mass 14 is able to move. The term 'movable' is used to indicate that the fingers are able to move relative to the support 12 by virtue of the fact that they are provided on the proof mass which is, itself, movable relative to the support 12, not to suggest that the individual fingers are able to move relative to the proof mass 14. The support 12 has associated therewith a first pair of upper and lower groups 28, 30 of fixed capacitor fingers. The fingers of the upper group 28 are interdigitated with those of the upper group 24, and the fingers of the lower group 30 are interdigitated with those of the lower group 26. Similarly, the second mass element 20 is provided with upper and lower groups 32, 34 of movable capacitor fingers, interdigitated with a second pair of upper and lower groups 36, 38 of fixed capacitor fingers associated with the support 12. The first and second upper groups 28, 36 are associated with the upper part 12a of the support 12 and the first and second lower groups 30, 38 are associated with the lower part 12b of the support 12. As best shown in FIG. 6, the fingers of each interdigitated pair of groups are not equally spaced. In each case, the fixed fingers of each of the groups 28, 30, 36, 38 associated with the support 12 lie closer to the adjacent moveable finger nearest the brace bar 22 than it does to the adjacent movable finger more remote from the brace bar 22, when the proof mass 14 occupies its central, rest position. However, arrangements may be possible in which this is reversed.

Figure 2:
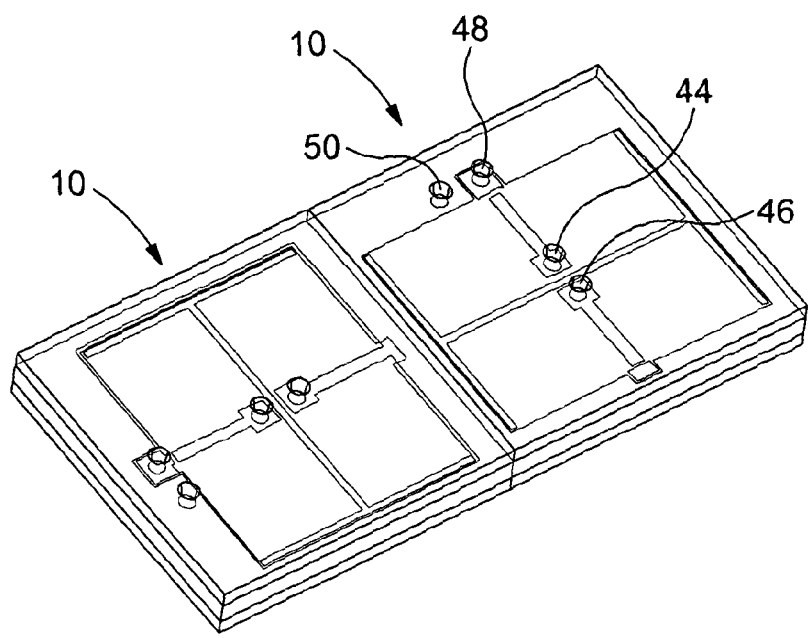
FIG. 2 is a perspective view illustrating an accelerometer device incorporating a pair of accelerometers of the type shown in FIG. 1.
Figure 3:
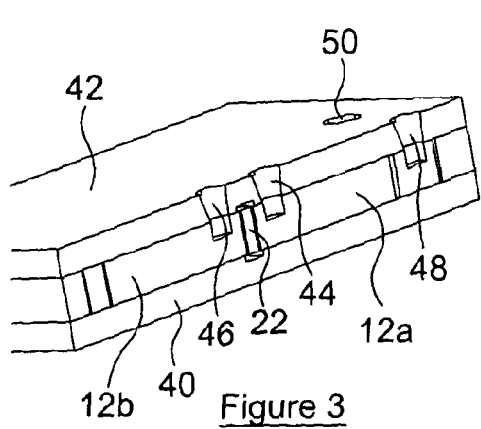
FIGS. 3 and 4 are sections through parts of the device of FIG. 2.
Figure 4:
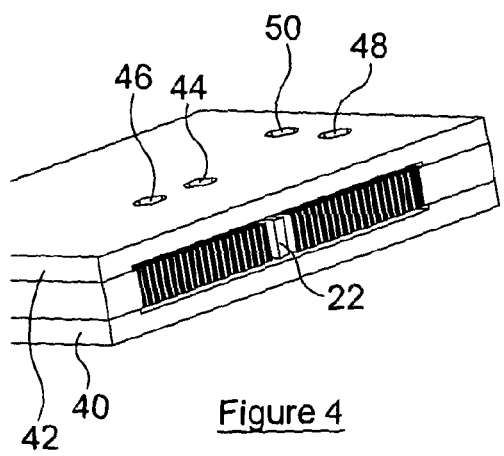

As mentioned hereinbefore, the support 12, proof mass 14 and mounting legs 16 are formed integrally with one another. As best shown in FIGS. 2, 3 and 4, the silicon wafer from which these components are formed is conveniently sandwiched between a pair of glass or other suitable material substrates 40, 42, the substrates 40, 42 being appropriately recessed so as to result in the support 12 bearing against the substrates 40, 42 so as to be supported thereby, whilst the mounting legs 16 and proof mass 14 are spaced therefrom by a small distance so as to ensure that the proof mass 14 is free to move in the sensing direction A in the event of the accelerometer 10 being subject to an acceleration in that direction.

The space between the substrates 40, 42, the proof mass 14 and the support 12 is filled with a damping medium, conveniently a gaseous damping medium, for example air, preferably at substantially atmospheric pressure. Consequently, the operation of the accelerometer will be subject to squeeze damping. By appropriate selection of the gaps between the fingers, the lengths of the fingers, etc., critical damping may be achieved if desired, which is desirable where the accelerometer is used in an open loop configuration.

The roots of the mounting legs 16, i.e., the points at which they join the support 12, are close to the axis of the support 12, and so the roots of the mounting legs 16 attached to the upper part 12a are close to one another, and the roots of the mounting legs 16 attached to the lower part 12b are close to one another. As a consequence, stresses resulting from differential thermal expansion of the materials of the substrates 40, 42 and the wafer from which the support 12, proof mass 14 and mounting legs 16 are formed are minimized. This is important as the resonant frequency of the proof mass 14 is dependent, in part, upon the stressing of the mounting legs 16.

FIGS. 2, 3 and 4 further illustrate suitable locations whereby electrical vias or connections can be made to the capacitor fingers of each of the groups. As shown, the support 12 has two electrical connections 44, 46 provided thereon. The connections or vias may be fabricated using a range of known techniques. One convenient technique involves powder blasting through the substrate 40 and into the material of the support 12 to form a, for example, substantially frustoconical recess, the surface of which is then metallized to provide a good electrical connection to the associated part of the support 12. The connection 44 is provided on the upper part 12*a* and provides an electrical connection to the first and second upper groups of fixed fingers 28, 36, and the connection 46 is provided on the lower part 12*b* and provides an electrical connection to the first and second lower groups of fixed fingers 30, 38. It will be appreciated that as the first and second upper groups of fixed fingers 28, 36 extend from opposite sides of the upper part 12*a* of the support 12, it is convenient to use a single, shared connection for both of these groups, and likewise it is convenient to use a single, shared connection for both of the lower groups of fixed fingers. In contrast to a typical differential capacitor accelerometer arrangement of the type described hereinbefore, it will be appreciated that the arrangement of the invention allows a reduction in the number of connections to be made. Consequently, significant space savings and size reductions can be achieved, and the manufacturing process can be significantly simplified.

In addition to the connections 44, 46, the accelerometer is further provided with a connection 48 whereby a drive signal can be applied to the groups of movable fingers associated with the proof mass 14, and a ground connection 50 is also provided. These connections may be of a form similar to that described hereinbefore.

In use, if the accelerometer 10 is subject to an acceleration in the direction A resulting in an upward movement of the proof mass 14 relative to the support 12, in the orientation shown in FIG. 1, this will result in the spacing between the closest ones of the fingers of upper groups 24, 28, 32, 36 reducing whilst the spacing between the closest ones of the fingers of the lower groups 26, 30, 34, 38 will increase by an equal amount. It will be appreciated that the change in spacing of the fingers results in the capacitance therebetween also changing, and by appropriate monitoring of the differential capacitance, an output can be achieved that provides an indication of the position of the proof mass 14 relative to the support 12. As the position occupied by the proof mass 14 is related to the magnitude of an applied acceleration, it will be appreciated that by monitoring of the capacitance, an indication of the magnitude of the applied acceleration can be output.

The manner in which the capacitance is monitored is conveniently substantially as described in U.S. Pat. No. 7,047,808, that is to say that a, for example, square wave drive voltage is preferably applied to the connection 44 and thus to the first and second upper groups 28, 36 of fixed fingers associated with the support 12 whilst a similar, but anti-phase, square wave drive signal is applied to the connection 46, and so to the first and second lower groups 30, 38 of fixed fingers. By appropriate monitoring and processing of a signal derived from the groups of movable fingers mounted upon the proof mass 14 by way of the connection 48, an output indicative of the applied acceleration can be achieved. The output may be derived either using an open loop type configuration or in a closed loop manner. As the manner by which the capacitance is monitored is largely in accordance with known techniques, for example as described in U.S. Pat. No. 7,047,808, it will not be described herein in further detail. It should be noted that the manner in which the differential capacitance is monitored need not be as outlined hereinbefore. For example, rather than apply antiphase inputs to the connections 44, 46 and use the connection 48 to provide an output, an input signal could be applied to the connection 48 and the differential outputs at the connections 44, 46 monitored to derive an output signal. Furthermore, although reference is made to the use of square wave signals, the invention is not restricted in this regard.

Figure 5:
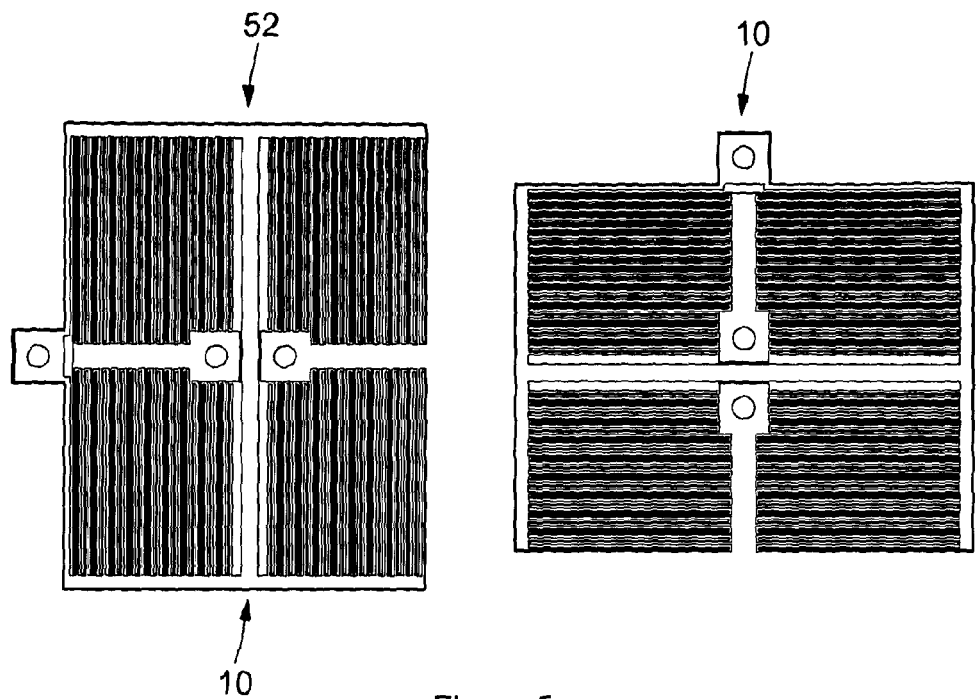
FIG. 5 is a plan view illustrating the device of FIG. 2.

As shown in FIGS. 2 and 5, the accelerometer 10 conveniently forms part of a larger accelerometer device 52 made up of two accelerometers 10 located adjacent one another and orientated such that the sensing directions A thereof are perpendicular to one another. If desired, the substrates 40, 42 may be common to both accelerometers 10. An accelerometer device 52 of this form allows accelerations in two perpendicular directions or axes to be monitored. As each individual accelerometer 10 is of relatively compact form and requires only a reduced number of electrical connections to be made, the accelerometer device 52 can also be of relatively compact and simply form.

The accelerometer 10 and device 52 may take a range of forms. It is envisaged that the device 52 may be of dimensions approximately 2.1 mm×4.2 mm. In such an arrangement, the silicon wafer from which the support 12, mounting legs 16 and proof mass 14 are formed is conveniently of thickness approximately 150 μm, the mounting legs 16 may be of width approximately 7-8 μm, and so having an aspect ratio in the region of 20:1, the fingers being of length approximately 0.7 mm and width approximately 6 μm, with a finger spacing of 9-15 μm, and with each group of fingers including 18 fingers. In such an arrangement, the brace 22 may be of length approximately 0.85 mm and width 50 μm. It will be appreciated, however, that these dimensions are merely examples and that a wide range of other arrangements are possible.

Figure 7:
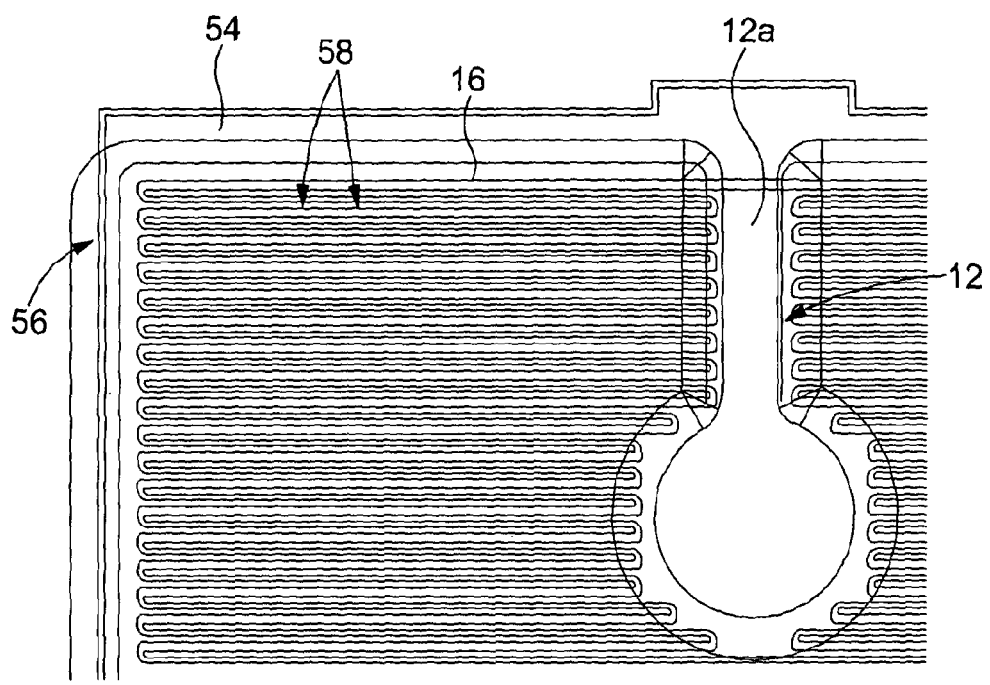
FIGS. 7 to 9 are views illustrating a modification to the arrangement of FIGS. 1 to 6.
Figure 8:
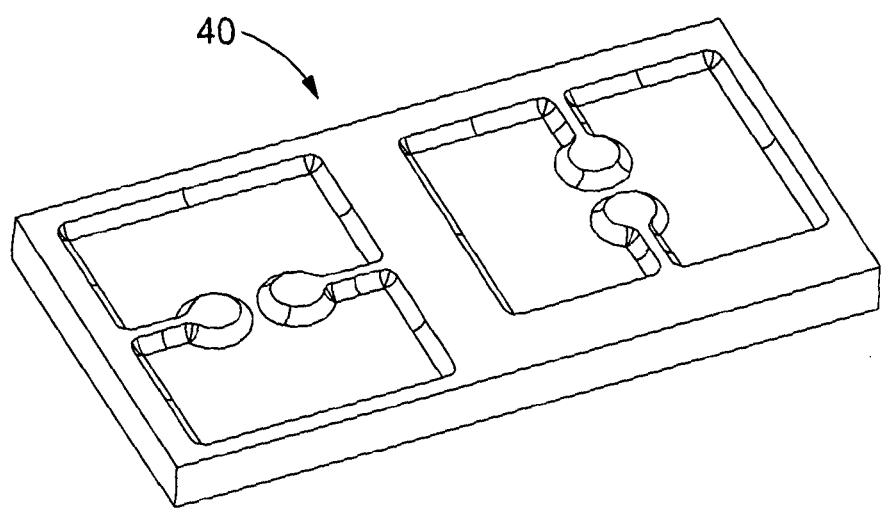
Figure 9:
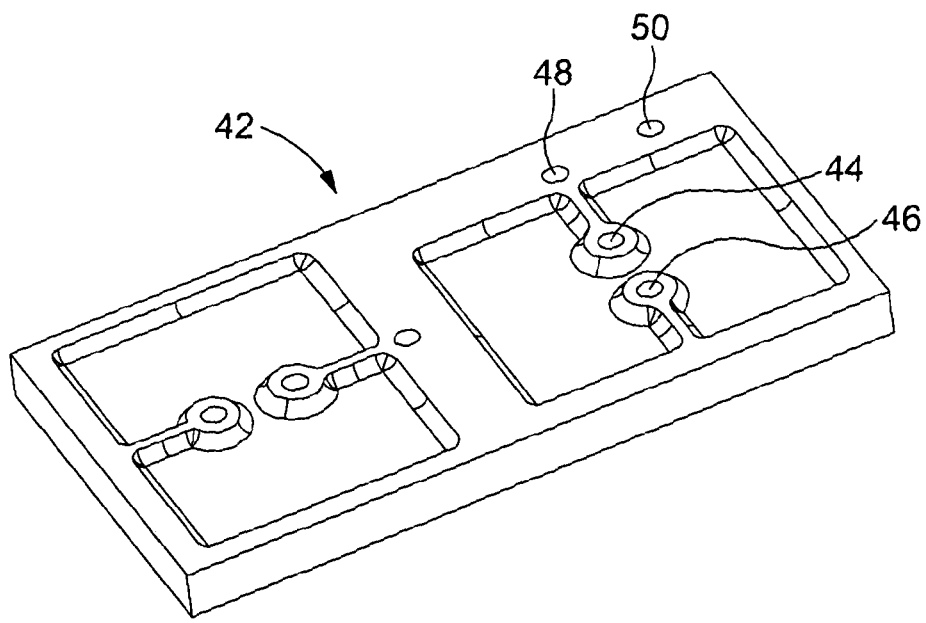

It is desirable for the accelerometer 10 to be able to withstand significant accelerations without sustaining damage thereto. In the arrangement described hereinbefore, a very large acceleration in the sensing direction A would result in an end part of each of the first and second mass elements 18, 20 butting against an adjacent part of the support 12. Such contact would occur before contact is made between adjacent ones of the interdigitated fingers, and so the risk of damage thereto, or stiction between the fingers occurring is low. However, engagement between the parts of the proof mass 14 and the support 12 may result in electrical conduction therebetween, temporarily shorting the proof mass 14 to ground and so resulting in a temporary loss of output or reduction in output accuracy. Whilst, in some applications, such short-term, temporary shorting may not be problematic, there may be circumstances in which it would be desirable to avoid such shorting. FIGS. 7 to 9 illustrate a modification to the arrangement described hereinbefore in which such shorting can be avoided.

As shown in FIGS. 7 to 9, the support 12 is provided with fixed stop members 54 which extend adjacent to, but spaced apart from, the mounting legs 16, and which are non-movably fixed to the substrates 40, 42. The stop members 54 are electrically connected to, and so are constantly at substantially the same potential as, the various component parts of the proof mass 14, and are shaped at their free ends to include abutment parts 56 arranged to abut or engage the end parts of the first and second mass elements 16, 18 in the event that the proof mass 14 moves to a predetermined limit position, preventing further movement of the proof mass 14. As the stop members 54 are held at the same potential as the proof mass 14, it will be appreciated that such contact does not result in shorting of the proof mass 14 to ground.

In case the fingers do come into contact with one another, the fingers, as shown in FIG. 7, may be provided with small pips 58 which are aligned in such a manner that the contact will be between the pips 58 of adjacent fingers, rather than substantially the entire surfaces thereof, and so further reduce the risk of stiction.

FIGS. 7, 8 and 9 clearly shows which parts of the silicon wafer from which the support 12, mounting legs 16 and proof mass 14 are formed are anodically bonded to the substrates 40, 42, and which parts are spaced therefrom by a small distance, arising from the formation of shallow recesses in the substrates 40, 42, and so are free to move relative thereto. Specifically, FIG. 7 shows that the support 12 and stop members 54 are bonded to the underlying substrate 40, whilst the proof mass 14 and mounting legs 16 are free to move relative thereto, other than the very end part of each mounting leg 16 most remote from the associated mass element. It further shows that the support 12 is broken by the entire thickness of the relevant part of the wafer being etched away with the result that the upper and lower groups of fixed fingers are electrically isolated from one another. Although these features are shown most clearly in FIGS. 7 to 9, it will be appreciated that the arrangement of FIGS. 1 to 6 is very similar in this regard.

Whilst specific embodiments of the invention are described herein, it will be appreciated that a wide range of modifications and alterations may be made to the arrangements described and illustrated without departing from the scope of the invention.

What is claimed is:

1. A linear accelerometer comprising a support, a first mass element and a second mass element, the mass elements being rigidly interconnected to form a unitary movable proof mass, the support being located at least in part between the first and second mass elements and having groups of fixed capacitor fingers extending from opposite sides thereof, a plurality of mounting legs supporting the mass elements for movement relative to the support, at least two first groups of movable capacitor fingers provided on the first mass element and interdigitated with corresponding first groups of fixed capacitor fingers extending from the support, and at least two second groups of movable capacitor fingers provided on the second mass element and interdigitated with corresponding second groups of fixed capacitor fingers extending from the support, wherein a single, shared first electrical connection is provided to permit connection to two of the first and second groups of fixed capacitor fingers extending from the support, and wherein a single, shared second electrical connection is provided to permit connection to another two of the first and second groups of fixed capacitor fingers extending from the support, and wherein said mounting legs have roots that are close to one another to minimize stresses resulting from differential thermal expansion.

2. An accelerometer according to claim 1, further comprising stop formations operable to limit the distance through which the mass elements are able to move.

3. An accelerometer according to claim 2, wherein the stop formations are arranged to limit such movement to a degree sufficient to prevent contact between adjacent ones of the capacitor fingers.

4. An accelerometer according to claim 2, wherein the stop formations are provided on a part of the support that is at the same electrical potential as the first and second mass elements.

5. An accelerometer according to claim 1, wherein the mass elements are interconnected by a brace bar.

6. An accelerometer according to claim 5, wherein the brace bar extends between the first and second groups of fingers of each the first and second mass elements and the support.

7. An accelerometer according to claim 1, wherein the mass elements and support are fabricated by etching of a silicon wafer supported, in use, between a pair of substrates.

8. An accelerometer according to claim 7, wherein a space between the mass elements and the support is sealed and gas filled so as to provide damping to movement of the proof mass.

9. A two axis accelerometer device comprising a pair of accelerometers as claimed in claim 1 formed integrally with one another and orientated so as to be perpendicular to one another.

10. An accelerometer according to claim 3, wherein the stop formations are provided on a part of the support that is at the same electrical potential as the first and second mass elements.

11. An accelerometer according to claim 1, wherein the first connection is provided on an upper part of the support and the second connection is provided on a lower part of the support.

12. An accelerometer according to claim 11, wherein the upper support part and lower support part are separated by a break.

13. An accelerometer according to claim 1, further comprising a connection whereby a drive signal can be applied to the first and/or second groups of moveable capacitor fingers.

14. An accelerometer according to claim 5, wherein the brace bar extends through a break in the support.

* * * * *